United States Patent
Chiang (10) Patent No.: US 6,571,838 B1
(45) Date of Patent: Jun. 3, 2003

(54) WOOD MACHINING APPARATUS WITH A SAWDUST COLLECTING MECHANISM

(76) Inventor: Pei-Lieh Chiang, No. 12, Nan-Ping Rd., Nan Dist., Taichung City (TW)

( * ) Notice: Subject to any disclaimer, the term of this patent is extended or adjusted under 35 U.S.C. 154(b) by 0 days.

(21) Appl. No.: 10/193,358

(22) Filed: Jul. 11, 2002

(30) Foreign Application Priority Data

Apr. 19, 2002 (TW) ........................................ 91205357 U (51) Int. Cl.$^7$ .......................... B27G 21/00; B27G 19/00
(52) U.S. Cl. ................. 144/252.1; 15/312.12; 15/314; 15/91; 83/167; 144/114.1; 451/453; 451/456
(58) Field of Search ................................ 15/312.2, 314, 15/415.1, 339, 91; 83/100, 167; 144/114.1, 117.1, 129, 130, 252.1; 409/137; 451/435, 453, 456

(56) References Cited

U.S. PATENT DOCUMENTS

| | | | |
|---|---|---|---|
| 2,637,396 A | * 5/1953 | Spiller et al. | ............ 144/252.1 |
| 4,392,268 A | * 7/1983 | Bueno | |
| 4,555,874 A | * 12/1985 | Chung | ........................ 451/453 |
| 6,293,321 B1 | * 9/2001 | Chiang | .................... 144/252.1 |

* cited by examiner

Primary Examiner—W. Donald Bray
(74) Attorney, Agent, or Firm—Trop, Pruner & Hu, P.C.

(57) ABSTRACT

A wood machining apparatus includes a sawdust collector having a supporting wall that supports a base of a cutter carriage thereon, two upright walls extending downward from the supporting wall to define a bin-receiving space therebetween, a mounting rod extending between bottom ends of the upright walls, and a sawdust collecting bin pivoted to the mounting rod in such a manner that the bin is turnable about the mounting rod between a sawdust collecting position, in which, a top opening of the bin is confined in the bin-receiving space to receive sawdust discharged from the cutter carriage, and a sawdust removing position, in which, the top opening is exposed outwardly of the bin-receiving space to facilitate removal of the sawdust from the bin.

2 Claims, 7 Drawing Sheets

FIG. 7

WOOD MACHINING APPARATUS WITH A SAWDUST COLLECTING MECHANISM

CROSS REFERENCE TO RELATED APPLICATION

This application claims priority of Taiwan Application No. 91205357, filed on Apr. 19, 2002.

BACKGROUND OF THE INVENTION

1. Field of the Invention

The present invention relates to a wood machining apparatus, more particularly to a sawdust collector for a wood machining apparatus 2. Description of the Related Art Referring to FIGS. 1 and 2, a conventional wood machining apparatus 10 according to U.S. Pat. No. 6,293,321 B1 is shown to include: a base 11, a cutter carriage 13, a motor housing 15 mounted on the cutter carriage 13 and having a vent port, a motor (not shown) disposed in the motor housing 15, a rotary cutter 14 mounted on the cutter carriage 13, a shaft 12 extending from the rotary cutter 14 and driven by the motor, a blower 22 mounted on the cutter carriage 13 and having a fan 221 that is driven by the shaft 12, a sawdust-guiding member 21 mounted on the cutter carriage 13 and having a box 211 and a spout which extends from the box 211 to the rotary cutter 14 to define a sawdust passage, an air duct 212 in fluid communication with the vent port of the motor housing 15 and the box 211, a first conduit 23 in fluid communication with the blower housing 22 and the box 211, a second conduit 24 in fluid communication with the blower housing 22, and a sawdust collector 25 in fluid communication with the second conduit 24. In operation, sawdust enters the spout, and is carried by the air flowing through the sawdust passage and the first and second conduits 23, 24 into the sawdust collector 25.

Figure 1:
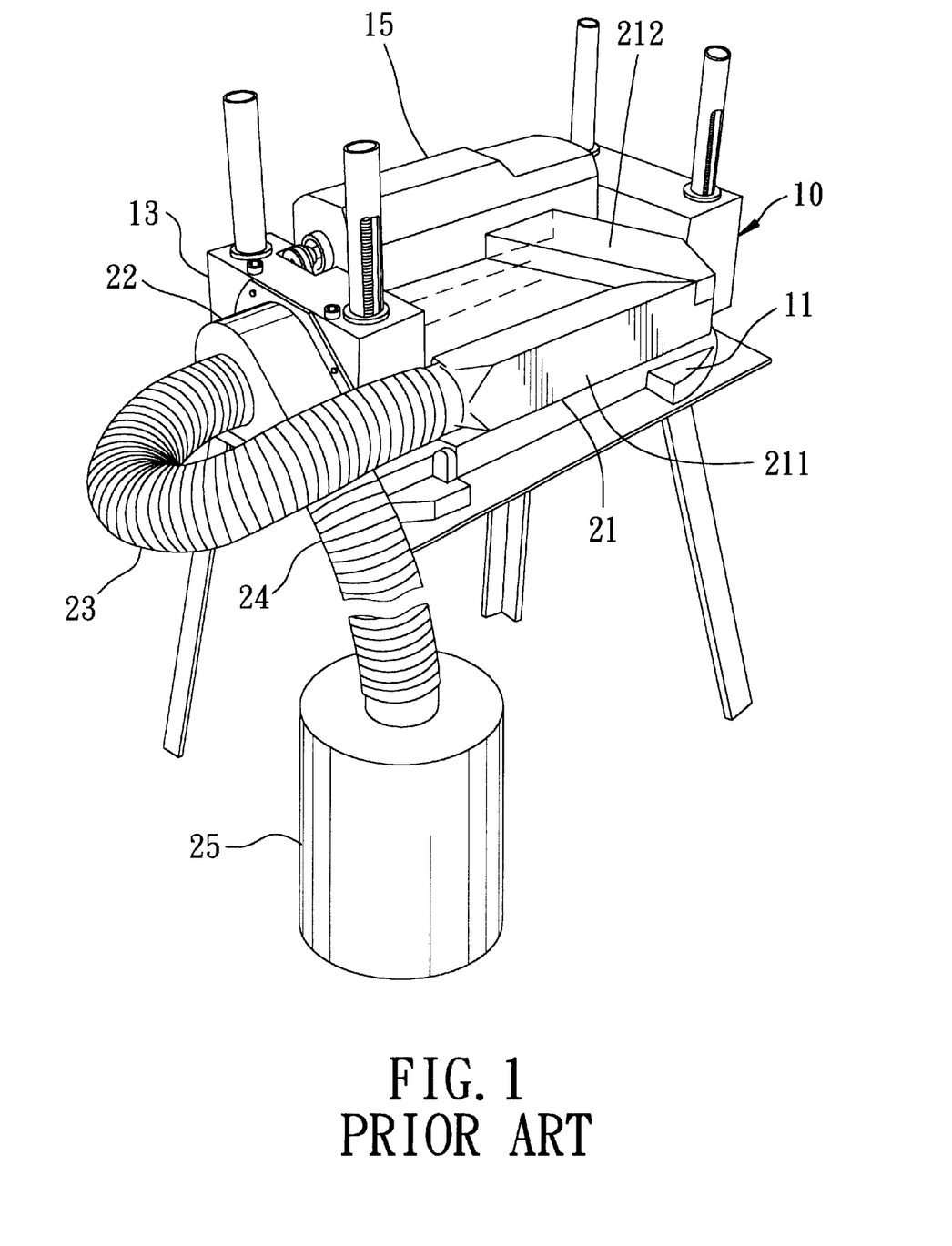
FIG. 1 is a perspective view of a conventional wood machining apparatus according to U.S. Pat. No. 6,293,321 B1.
Figure 2:
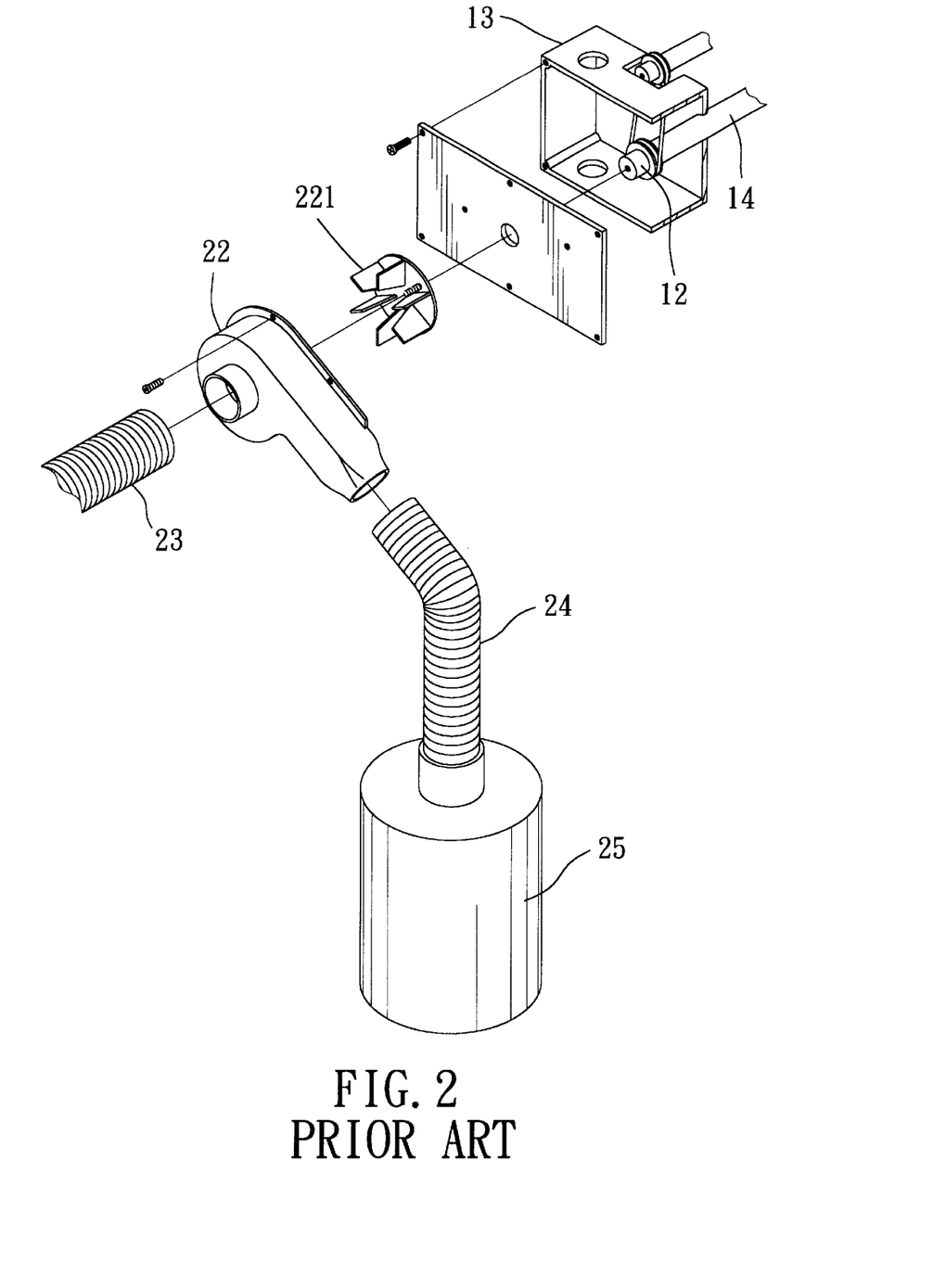
FIG. 2 is a partly exploded view of the conventional wood machining apparatus shown in FIG. 1.

The aforementioned conventional wood machining apparatus 10 occupies a relatively large amount of space since the sawdust collector 25 is disposed externally of the base 11.

SUMMARY OF THE INVENTION

Therefore, the object of this invention is to provide a wood machining apparatus in which a sawdust collector can be disposed directly below a cutter carriage so as to save space.

Accordingly, a wood machining apparatus of the present invention includes a base, two pairs of supporting rods, a cutter carriage, a rotary cutter, a blower, a sawdust-guiding member, a conduit, and a sawdust collector. The base has two opposite sides and front and rear sides. The supporting rods respectively extend uprightly from the opposite sides of the base. The cutter carriage includes a pair of parallel carriage casings mounted movably and respectively on the supporting rods. The rotary cutter is mounted rotatably on, and extends between the carriage casings, and is adapted to plane a wooden workpiece thereunder. The blower is mounted on one of the carriage casings, and has a blower housing. The sawdust-guiding member includes an air duct that extends between and that is mounted on the carriage casings, that is connected to and that is in fluid communication with the blower, and that is adapted to receive sawdust generated by the rotary cutter during a machining operation. The conduit has a first end connected to and in fluid communication with the blower housing, and a second end opposite to the first end. The sawdust collector is disposed below the base, includes a casing having two opposite upright walls with top and bottom ends, and a supporting wall that interconnects the top ends of the upright walls to support the base thereon, and that cooperates with the upright walls to confine a bin-receiving space. The supporting wall is formed with a conduit opening to permit extension of the second end of the second conduit therethrough. A mounting rod is mounted on and extends between the bottom ends of the upright walls at the rear side of the base. A sawdust collecting bin defines a sawdust-collecting space therein, has a top opening for access into the sawdust-collecting space, and two opposite side walls that confine two opposite sides of the sawdust-collecting space, and is pivoted to the mounting rod in such a manner that the sawdust collecting bin is turnable about the mounting rod between a sawdust collecting position, in which the top opening in the sawdust collecting bin is enclosed in the bin-receiving space so as to permit collection of sawdust from the air duct via the conduit into the sawdust collecting space, and a sawdust removing position, in which the top opening in the sawdust collecting bin is exposed outwardly of the bin-receiving space so as to facilitate removal of sawdust from the sawdust collecting space.

BRIEF DESCRIPTION OF THE DRAWINGS

Other features and advantages of this invention will become more apparent in the following detailed description of the preferred embodiments of this invention, with reference to the accompanying drawings, in which.

DETAILED DESCRIPTION OF THE PREFERRED EMBODIMENT

Figure 3:
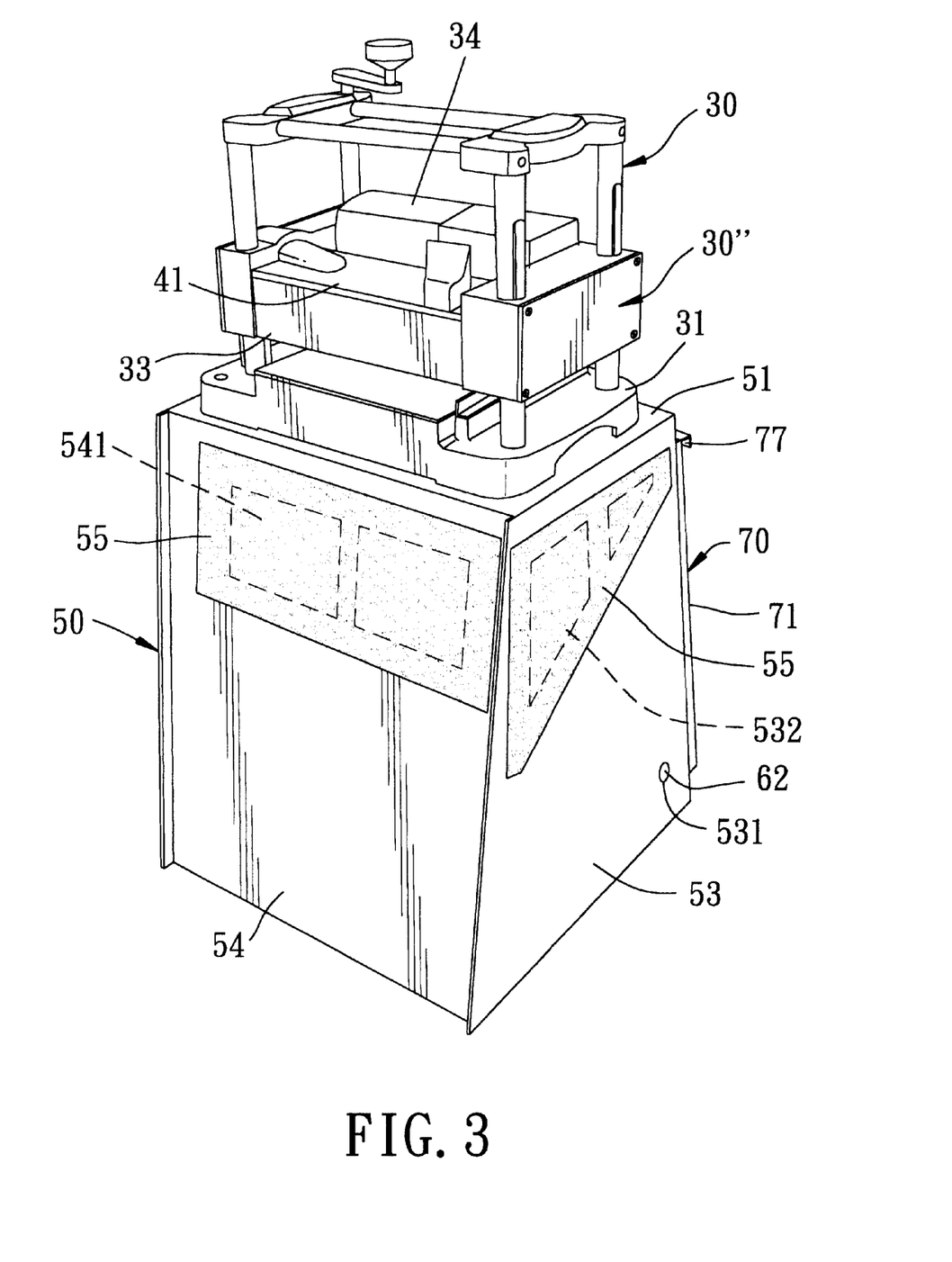
FIG. 3 is a perspective front view of a wood machining apparatus according to the present invention.
Figure 4:
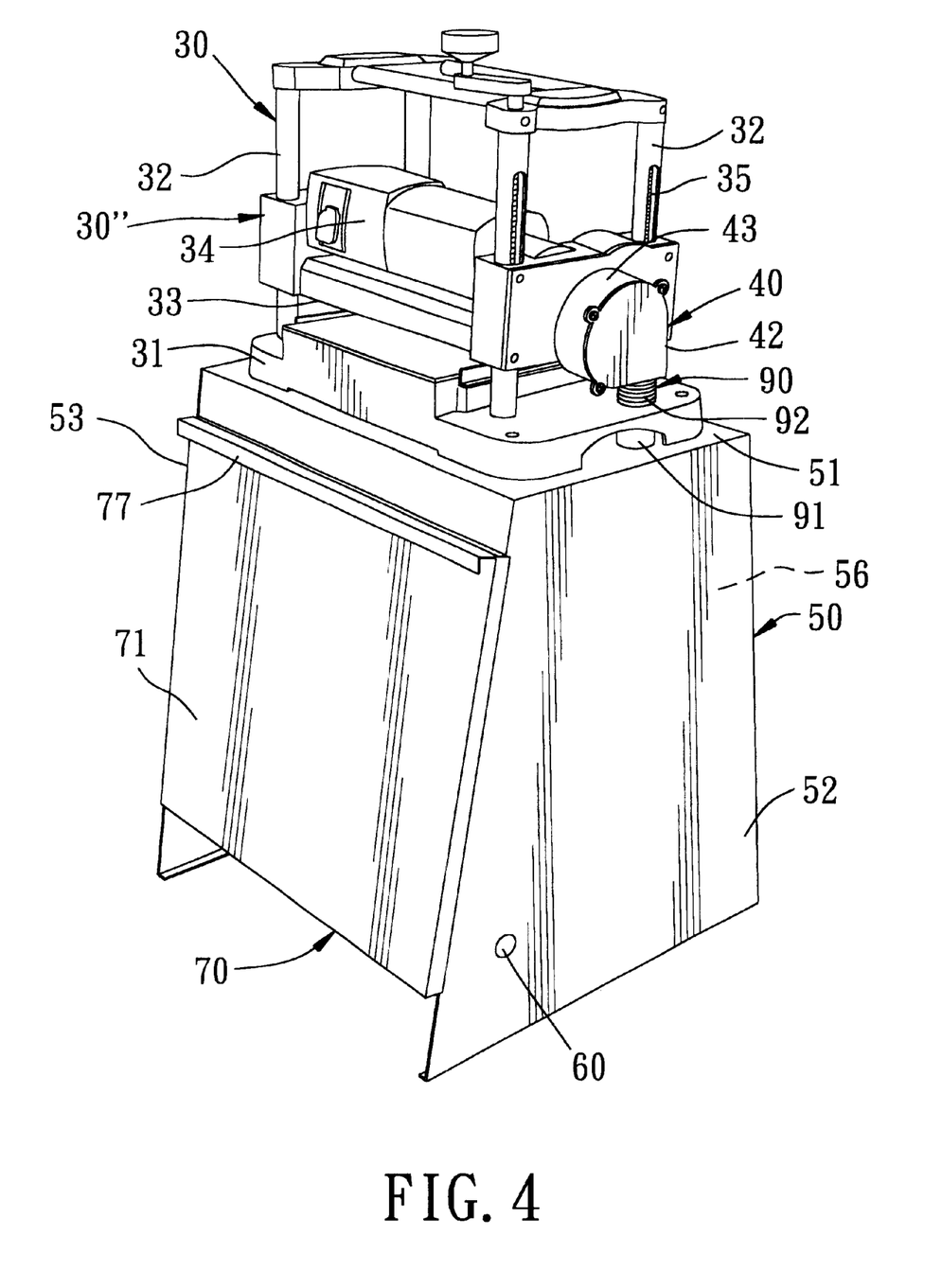
FIG. 4 is a perspective rear view of the wood machining apparatus according to the present invention.
Figure 5:
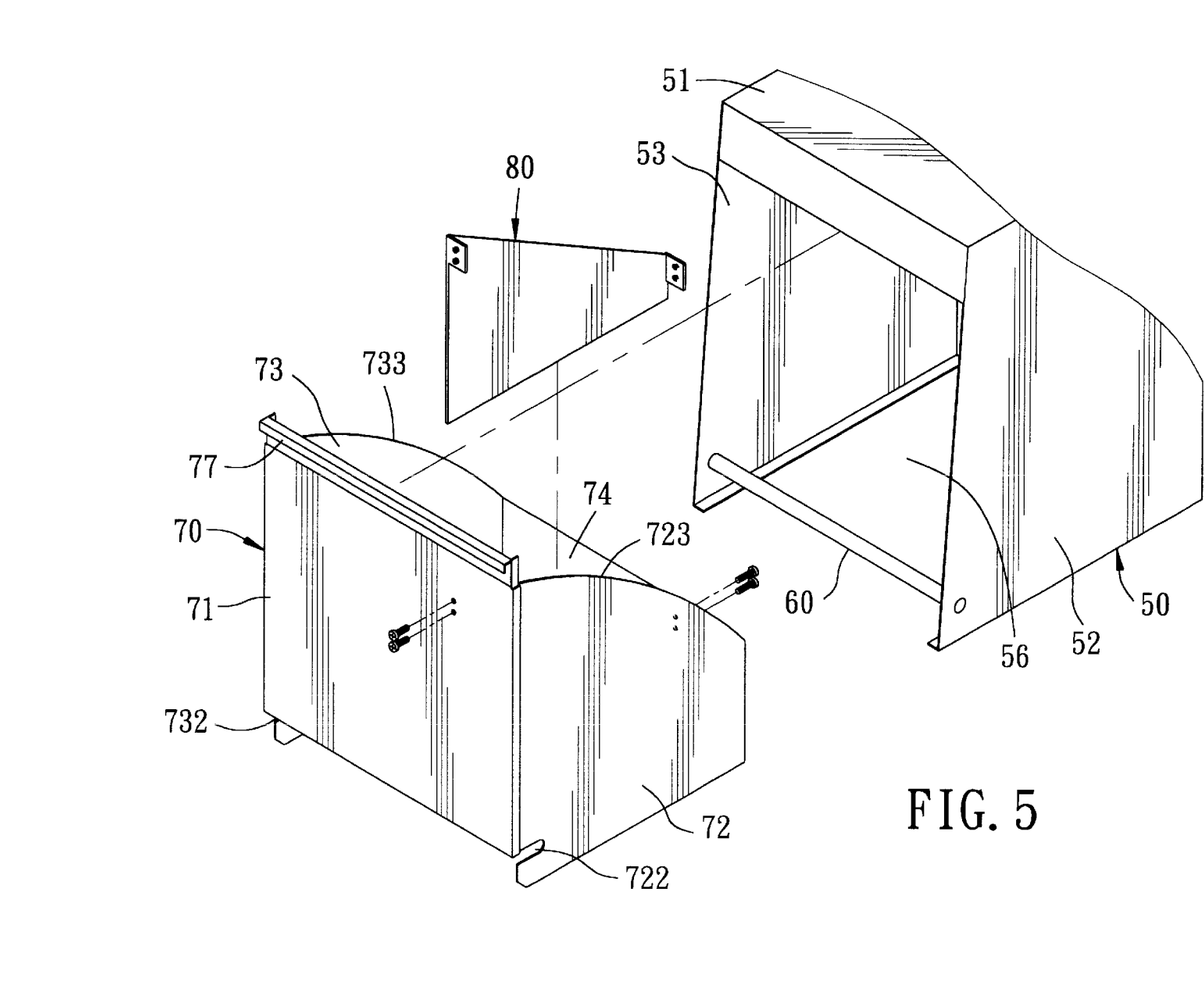
FIG. 5 is an exploded view of a sawdust collector employed in the wood machining apparatus of the present invention.

Referring to FIGS. 3 to 5, the preferred embodiment of a wood machining apparatus of the present invention is shown to include a base 31, two pairs of supporting rods 32, a cutter carriage 30, a motor housing 34, a rotary cutter 33, a blower 40, a sawdust-guiding member, a conduit 90 and a sawdust collector.

As illustrated, the base 31 has opposite left and right sides, and front and rear sides.

The pairs of supporting rods 32 extend respectively and uprightly from the left and right sides of the base 31.

The cutter carriage 30 includes left and right carriage casings 30" that are parallel to each other and that are mounted movably and respectively on the pairs of supporting rods 32.

The motor housing 34 is mounted on the cutter carriage 30 between the carriage casings 30" at the rear side of the base 31, and has a vent port that opens frontwardly. A motor (not shown) is disposed in the motor housing 34.

The rotary cutter 33 is mounted rotatably on, and extends between and below the carriage casings 30", and is adapted to plane a wooden workpiece (not shown) disposed thereunder. A rotatable shaft extends from the rotary cutter 33 through the right carriage casing 30", and is driven by the motor.

The blower 40 is mounted on the right carriage casing 30" opposite to the shaft, and has a blower housing 43 and a fan (not shown) connected to the shaft so as to be driven by the motor via the shaft.

The sawdust-guiding member includes an air duct 41 mounted on the cutter carriage 30 at the front side of the base 31, extending between the carriage casings 30", and in fluid communication with the vent port of the motor housing 34.

The conduit 90 has a first end 92 connected to and in fluid communication with the air duct 41, and a second end 91 opposite to the first end 92.

Figure 7:
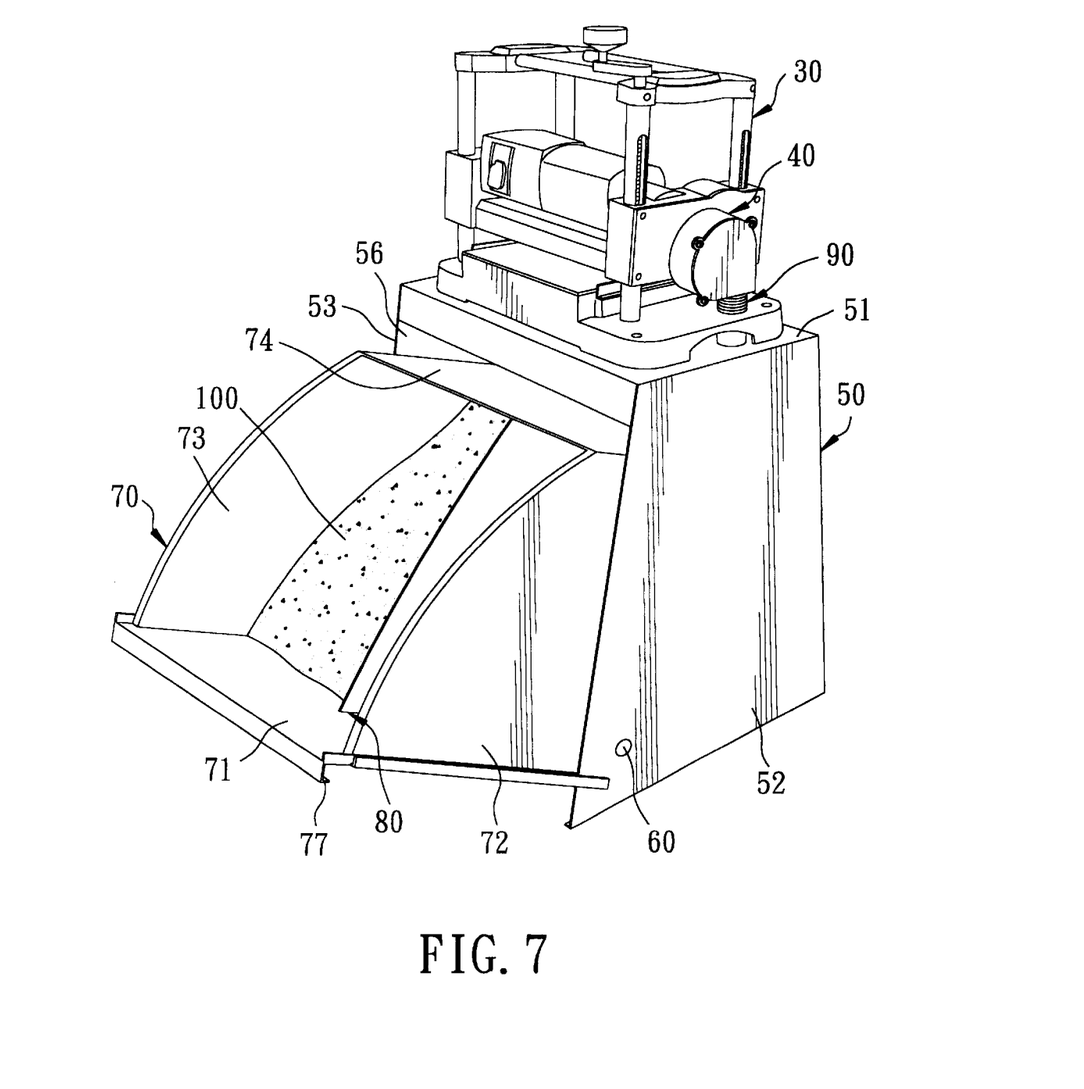
FIG. 7 is a perspective view of the wood machining apparatus of the present invention, in which, the sawdust collector is disposed at a sawdust removing position.

The sawdust collector is disposed below the base 31, includes a casing 50 having right and left upright walls 52, 53 with top and bottom ends and adapted to be disposed on a ground surface, and a supporting wall 51 that is transverse to and that interconnects the top ends of the upright walls 52, 53 to support the base 31 thereon, and that cooperates with the upright walls 52, 53 to define a bin-receiving space 56 thereamong. The supporting wall 51 is formed with a conduit opening to permit extension of the second end 91 of the conduit 90 therethrough and into the bin-receiving space 56. A mounting rod 60 extends between the bottom ends of the upright walls 52, 53 at the rear side of the base 31. A sawdust collecting bin 70 defines a sawdust-collecting space 76 therein, and has a top opening for access into the sawdust-collecting space 76, and two opposite side walls 72, 73 that define two opposite sides of the sawdust-collecting space 76. The sawdust collecting bin 70 is pivoted to the mounting rod 60 via two notches 722, 723 which are formed on rear sides of the side walls 72, 73 adjacent to the bottom ends thereof in such a manner that the sawdust collecting bin 70 is turnable about the mounting rod 60 between a sawdust collecting position, as best shown in FIGS. 3 and 4, in which the top opening in the sawdust collecting bin 70 is enclosed in the bin-receiving space 56 so as to permit collection of sawdust 100 (see FIG. 7) from the second end 91 of the conduit 90 into the sawdust-collecting space 76 upon activation of the motor, and a sawdust removing position, as best shown in FIG. 7, in which the top opening in the sawdust collecting bin 70 is exposed outwardly of the bin-receiving space 56 so as to facilitate removal of the sawdust 100 from the sawdust-collecting space 76. A handle member 77 is fixed to the rear wall 71 of the sawdust collecting bin 70 to facilitate holding of the bin 70 by the user.

Figure 6:
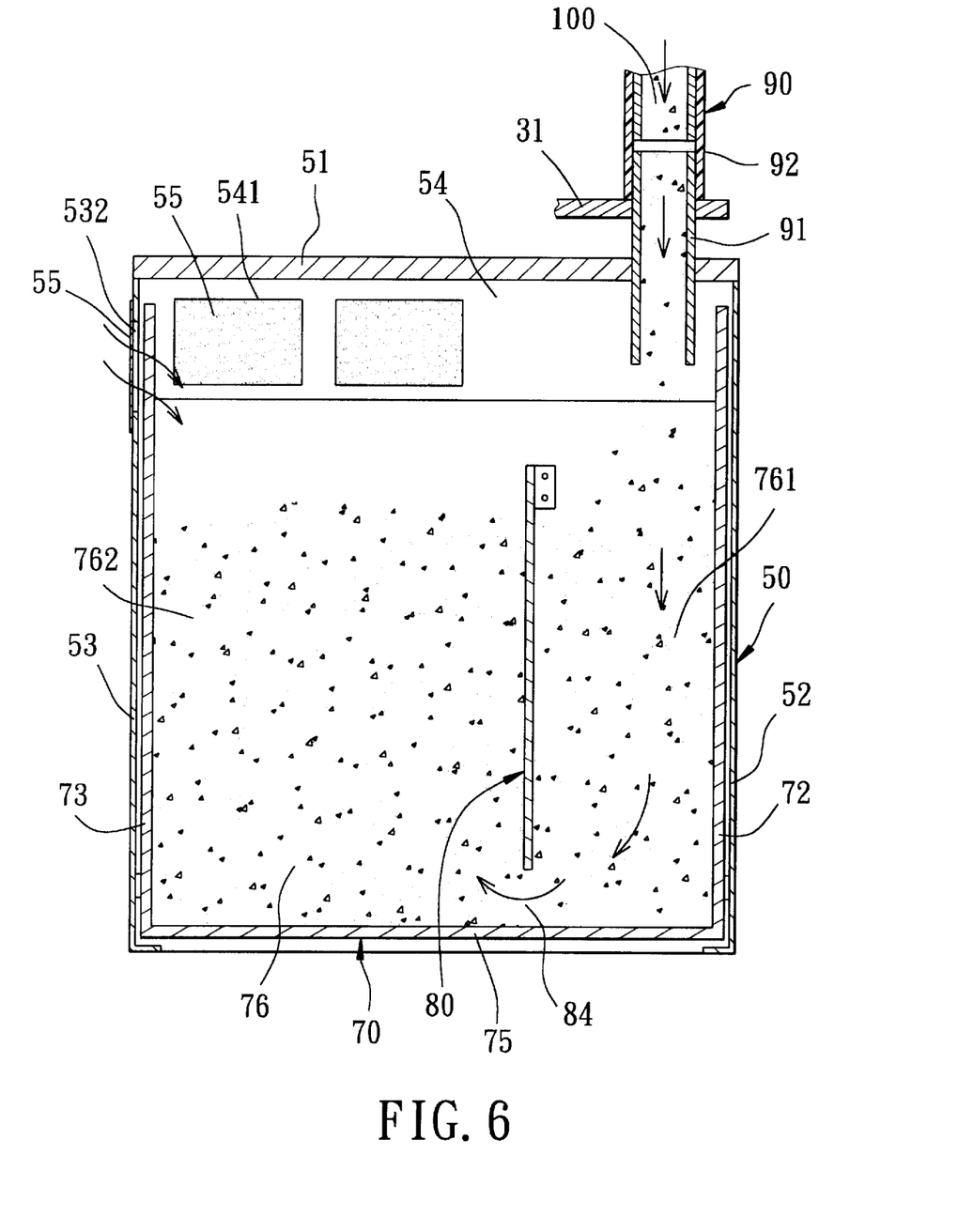
FIG. 6 is a sectional view of the sawdust collector employed in the wood machining apparatus of the present invention.

Referring to FIGS. 6 and 7, the sawdust collecting bin 70 has a bottom wall 75 which is opposite to the top opening and which defines a bottom side of the sawdust-collecting space 76, front and rear walls 74, 71 that are interposed between and that are connected to the opposite side walls 72, 73, and that define front and rear sides of the sawdust-collecting space 76, and a chamber-forming partition 80 that extends between and that is fixed to the front and rear walls 74, 71, and that has a bottom end spaced apart from the bottom wall 75 by a gap 84 so as to divide the sawdust-collecting space 76 into a first chamber 761 which is aligned with the second end 91 of the conduit 90, and a second chamber 762 which is offset from the second end 91 of the conduit 90. The first and second chambers 761, 762 are in fluid communication with each other via the gap 84.

Preferably, the front wall 54 and the left upright wall 53 of the casing 50 are formed with through holes, 541, 532 which are covered by screens 55so as to enhance collection of sawdust in the sawdust collecting bin 70 upon rotation of the fan via the motor.

With this invention thus explained, it is apparent that numerous modifications and variations can be made without departing from the scope and spirit of this invention. It is therefore intended that the invention be limited only as indicated in the appended claims.

I claim:

1. A wood machining apparatus comprising:

a base having opposite left and right sides and front and rear sides;

two pairs of supporting rods respectively extending uprightly from said left and right sides of said base;

a cutter carriage including a pair of parallel carriage casings mounted movably and respectively on said pairs of supporting rods, and adapted to mount a rotary cutter thereunder;

a blower mounted on one of said carriage casings and having a blower housing;

a sawdust-guiding member that includes an air duct that extends between and that is mounted on said carriage casings, that is connected to and, that is in fluid communication with said blower and that is adapted to receive sawdust generated by the rotary cutter during a machining operation;

a conduit having a first end connected to and in fluid communication with said blower housing, and a second end opposite to said first end; and a sawdust collector disposed below said base, including a casing having two opposite upright walls with top and bottom ends and adapted to be disposed on a ground surface, and a supporting wall that is transverse to and that interconnects said top ends of said upright walls to support said base thereon and that cooperates with said upright walls to define a bin-receiving space, said supporting wall being formed with a conduit opening to permit extension of said second end of said conduit therethrough and into said bin-receiving space, said sawdust collector further including a mounting rod extending between said bottom ends of said upright walls at said rear side of said base, and a sawdust collecting bin that defines a sawdust-collecting space therein, that has a top opening for access into said sawdust-collecting space and two opposite side walls defining two opposite sides of said sawdust-collecting space, and that is pivoted to said mounting rod in such a manner that said sawdust collecting bin is turnable about said mounting rod between a sawdust collecting position, in which said top opening in said sawdust collecting bin is enclosed in said bin-receiving space so as to permit collection of sawdust from said air duct via said conduit into said sawdust-collecting space, and a sawdust removing position, in which said top opening in said sawdust collecting bin is exposed outwardly of said bin-receiving space so as to facilitate removal of sawdust from said sawdust-collecting space.

2. The wood machining apparatus as defined in claim 1, wherein said sawdust collecting bin has a bottom wall which is opposite to said top opening and which confines a bottom side of said sawdust-collecting space, front and rear walls interposed between and connected to said opposite side walls and confining front and rear sides of said sawdust-collecting space, and a chamber-forming partition that extends between and that is fixed to said front and rear walls, and that has a bottom end spaced apart from said bottom wall by a gap so as to divide said sawdust-collecting space into a first chamber which is aligned with said second end of said conduit, and a second chamber which is offset from said second end of said conduct and which is in fluid communication with said first chamber via said gap.

* * * * *